United States Patent [19]

Lamprecht et al.

[11] Patent Number: 4,922,276

[45] Date of Patent: May 1, 1990

[54] CONTINUOUS PROCESSING MACHINE FOR PHOTOGRAPHIC SHEET MATERIAL

[75] Inventors: Philipp Lamprecht, Brixen; Richard Piock, Bruneck; Siegfried Tasser, Brixen, all of Italy

[73] Assignee: Durst Phototechnik GmbH, Bozen, Italy

[21] Appl. No.: 383,972

[22] Filed: Jul. 21, 1989

[30] Foreign Application Priority Data

Jul. 25, 1988 [IT] Italy .................................. 4844 A88

[51] Int. Cl.[5] ........................... G03B 3/04; G03B 3/08

[52] U.S. Cl. .................................... 354/299; 354/316; 354/322; 354/328

[58] Field of Search ............... 354/299, 316, 320, 321, 354/322, 324, 328

[56] References Cited

U.S. PATENT DOCUMENTS 3,345,928 10/1967 Krehbiel ............................ 354/321
4,118,998 10/1978 Hope et al. ......................... 354/321
4,255,039 3/1981 Hope et al. ......................... 354/320
4,710,009 12/1987 Schneider ........................... 354/324

FOREIGN PATENT DOCUMENTS 3209262 9/1983 Fed. Rep. of Germany .
1435012 5/1973 United Kingdom ................ 354/321

*Primary Examiner*—A. A. Mathews
*Attorney, Agent, or Firm*—Cahill, Sutton & Thomas

[57] ABSTRACT

A continuous processing machine for photographic material, particularly sheet-shaped photographic paper, has an input unit for the sheet material to be treated and a variable number of treatment units of the same structure which can be fitted together with one another to form a modular system. Each treatment unit is equipped with a set of conveying rollers and with a synchronous motor used as the drive and includes a toothed gear transmission, the ratio of which can be adjusted corresponding to given values of the advancing speed of the sheet material. A conveyor worm in the bath receptacle of each treatment unit driven by the same motor provides an effective circulation of the bath.

The modular structure makes it possible to fit together a variable number of treatment units which are similar with respect to one another to form an equipment unit which, depending on the configuration stage is suitable for different treatment processes.

13 Claims, 2 Drawing Sheets

CONTINUOUS PROCESSING MACHINE FOR PHOTOGRAPHIC SHEET MATERIAL

BACKGROUND OF THE INVENTION

1. Field of the Invention

The present invention relates to a continuous processing machine for photographic material, particularly sheet-shaped photographic paper, comprising an input unit for the exposed sheet material, several bath receptacles arranged behind one another for accommodating different treatment baths, circulating devices for the baths and conveying devices for conveying the material through the baths.

2. Description of the Prior Art

Processing machines of this type are known and are commercially available in different constructions depending mainly on the output capacity, i.e., the number of copies to be produced per time unit. Processing machines for printing laboratories or professional photo labs, where high productivity is required, are complex and expensive, and the purchasing price and the operating costs are not acceptable for an amateur or a professional photographer who wants to do his or her own processing. The known processing machines, in addition, are usually designed for a specific treatment process so that different machines are required for the processing of material according to different treatment processes. This is contrary to the requirements of an amateur who works with different materials and processes or wants to leave open the possibility of experimenting with new materials or processes.

From DE-A 32 09 262, a processing arrangement is known which has several bath receptacles which with respect to one another have essentially the same structure and can be connected with one another. Conveying rollers are arranged on the inside of each receptacle which, while interacting with corresponding guiding devices, form a circular closed rotational path for the conveyed material, which, in this manner, can repeatedly pass through the bath until it arrives at the receptacle outlet after the operator switches a deflecting element. The arrangement permits the adjustment of the dwell time of the material in each bath corresponding to the processing duration indicated for a respective process. This results in higher flexibility at lower costs as a result of the possibility of adapting the instrument to different treatment processes. It is a disadvantage, however, that the arrangement, because of the discontinuous passage of the material through the successive treatment units, is not suitable for an automatic operation with a continuous input of the material to be treated. The adjustment of the individual treatment periods to a multiple of the circulating time of the material in the closed circulating path, in addition, results in a limitation of the programmability of individual processes. Finally, the dynamic coupling of the conveying rollers of the individual units to a common drive is relatively expensive and makes the disassembling of the apparatus into its individual components and its assembling more difficult so that the advantages of the otherwise flexible construction of the arrangement largely are lost.

It is the object of the invention to provide a processing machine of the initially mentioned type which has high flexibility with respect to the processing of materials according to different treatment processes, by furnishing continuously satisfactory results and which, in addition, distinguishes itself by a simple, space-saving construction and low manufacturing costs.

SUMMARY OF THE INVENTION

Briefly described, and in accordance with a preferred embodiment thereof, the present invention relates to a continuous processing machine for processing photographic sheet material, the processing machine including an input unit into which the sheet material is inserted, followed by two or more treatment units of identical construction, each including a bath receptacle for accommodating different treatment baths. The processing machine is constructed as a modular system wherein the aforementioned input unit and two or more treatment units can be coupled to one another for forming different equipment configurations consisting of the input unit and a variable number of treatment units.

Each of the aforementioned treatment units includes conveying rollers for conveying the sheet material through a treatment bath contained by the bath receptacle of each such treatment unit. Each treatment unit includes a separate electric drive for turning the conveying set of rollers therein. The electric drive of a first of such treatment units is supplied with electricity by the aforementioned input unit, and the electric drives of succeeding treatment units are supplied with electricity by each preceding treatment unit.

The electric drive of each of the aforementioned treatment units has a transmission ratio which can be mechanically adjusted corresponding to a number of predetermined advancing speeds for the sheet material to be treated. The conveying rollers of each such treatment unit are motionally connected with one another and with the aforementioned electric drive by a toothed gear transmission, preferably including a step gear for achieving different transmission ratios.

Each of the aforementioned treatment units preferably includes a circulating device for continuously circulating the treatment bath within the associated bath receptacle. The bath circulating device is mechanically actuated by the same electric drive used to turn the conveying rollers.

As a result of the modular construction according to the principle of modularity, a variable number of individual treatment units of the same structure can be connected with one another and with an input unit so that a processing machine can be formed which is tailored to a respective treatment process. As a result of the special form-locking capacity of the connecting parts, the individual units and the processing machine itself can be disassembled and assembled easily and rapidly and without the aid of any tools.

The possibility of changing the speed of passage of the material by means of a simple changing of toothed gears in the driving system at a constant rotational speed of the driving motor offers a simple means for adapting the processing machine to treatment processes with a different treatment duration for the material.

A conveyor worm in the treatment bath which is driven by the same motor as the material conveying device is an effective and, at the same time, low-cost circulating device for the bath because, as a result, a specific circulating pump is not required.

Other advantages and details of the invention are found in the claims in connection with the following description of a preferred embodiment with reference to the accompanying drawings.

DETAILED DESCRIPTION OF THE PREFERRED EMBODIMENT

Figure 1:
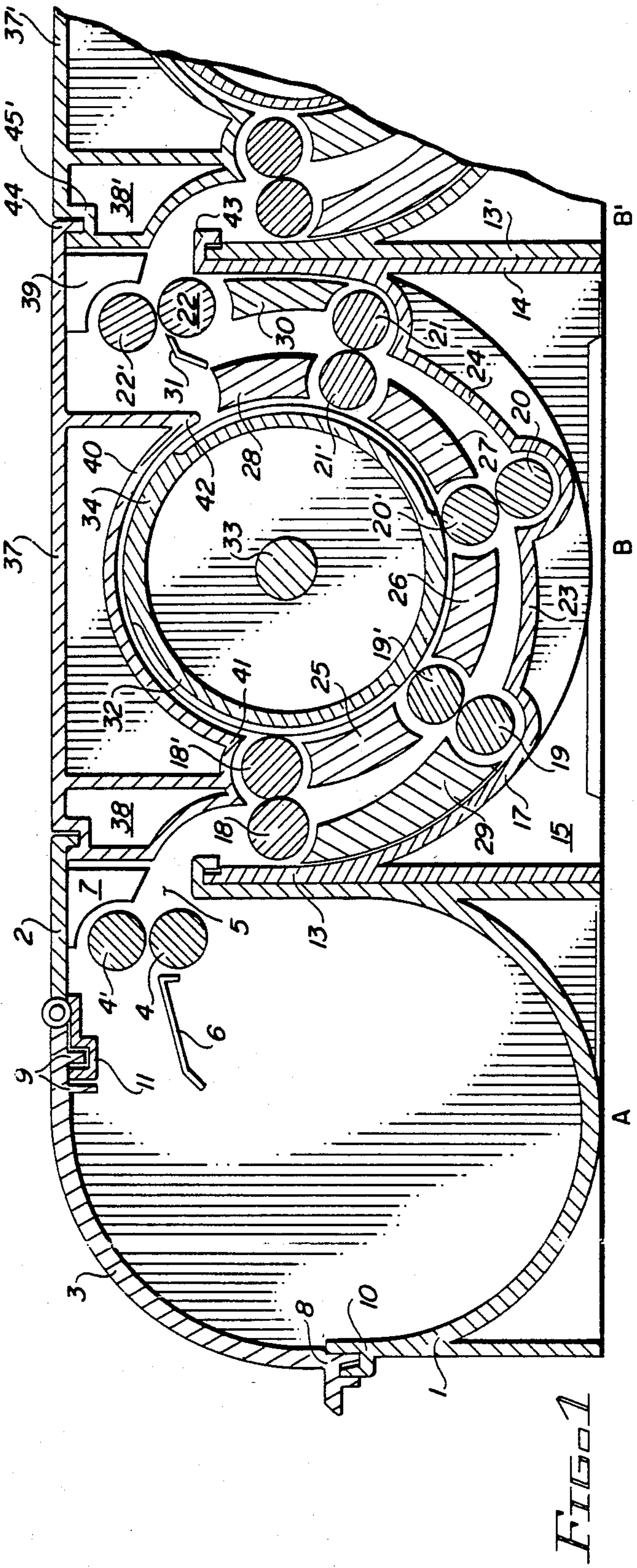
FIG. 1 is a vertical partial sectional view of the processing machine according to the invention consisting of an input unit and two treatment units.

The processing machine shown in FIG. 1 comprises an input unit A and two treatment units B and B', only a fragment of the latter being visible in the drawing.

The input unit comprises a box 1 with a cover 2 which, in turn, has a hinged lid 3 as an access to the interior of the box for inserting a sheet. In its upper area, the box has a pair of draw-in rollers 4-4' which conveys an inserted sheet to an outlet opening 5 and through this outlet opening 5 into the feeding channel of the connecting treatment unit. A feeder plate 6 directs the sheet into the roller gap, while guide vanes 7, which on the outlet side, project from the interior side of the cover 2, feed the sheet edge leaving the pair of rollers to the outlet. Edge projections 8 and 9 of the hinged lid 3, interacting with form-locking edge parts 10 and 11 of the box or of the cover, prevent light from entering into the box when the cover is closed.

Figure 2:
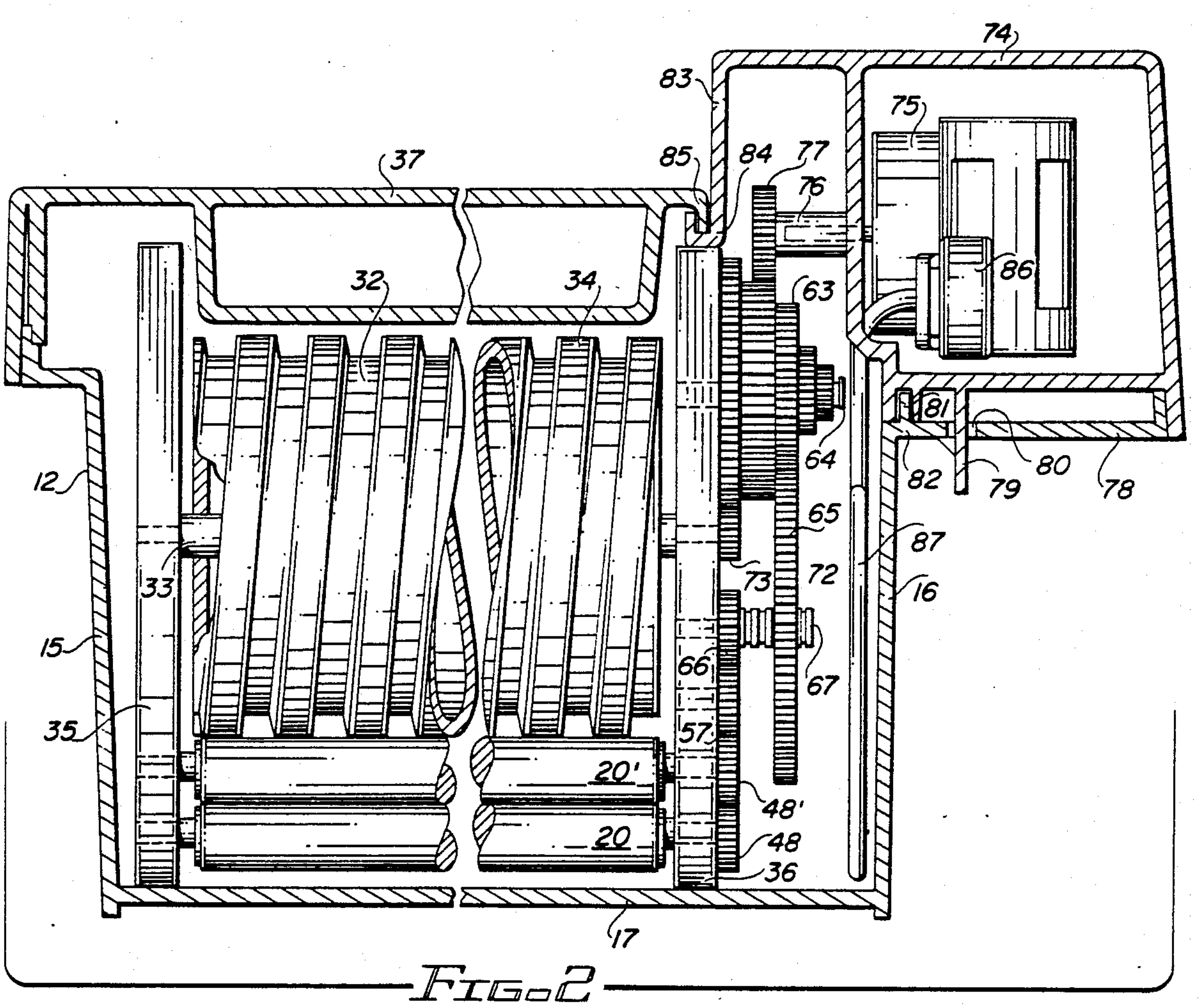
FIG. 2 is a sectional view of a treatment unit in its normal position with respect to the passage direction of the material to be treated.

In reference to FIGS. 1 and 2, the treatment unit B has a boat-shaped receptacle 12 with a front wall 13, a rear wall 14, front end walls 15 and 16 and a curved bottom 17. The receptacle is suited for accommodating a certain quantity of treatment fluid and is provided with an overflow part which is not shown and which indicates the maximum filling level of the bath. In the interior of the receptacle, a roller unit consisting of a row of roller pairs 18 - 18', 19 - 19', 20 20', 21 - 21' and 22 - 22' is arranged in such a manner that they form a passage path for the sheet material to be treated leading from the inlet side through the treatment bath to the opposite outlet side. Elevations 23 and 24 in the bottom 17, together with correspondingly shaped filling bodies 25 to 30, form the guide for the sheet material in the areas between successive roller pairs. A separate guiding plate 31 directs the sheet emerging from the treatment bath to the roller pair 22 - 22' situated on the outlet side which, in contrast to the other roller pairs, is located outside the liquid bath and has the function of a pair of pressing rollers for removing residual liquid from the sheet material, before it is guided to the next treatment phase. The central area of the receptacle is filled out by a conveyor worm 32 which can be rotated around a rotating shaft 33 and causes a circulation of the liquid in the direction of the rotating shaft, the flow of liquid in the area of the conveyor worm taking place in one direction, and the return flow in the bottom area of the receptacle taking place into the opposite direction. The conveying rollers and the conveyor worm, at the extreme ends, are disposed in bearing brackets 35 and 36 which are held together by the filling bodies 25 to 30, at the ends of which they are anchored. The roller system and the conveyor worm form a structural unit which is carried in the receptacle by means of suitable guiding and holding devices and can be removed from the receptacle as a whole.

A removable cover 37 covers the receptacle 12 in upward direction, but leaves open an inlet or outlet channel at the front and at the rear receptacle wall for the sheet material to be treated. On the inlet side, the cover 37 has guide ribs 38 at its interior side, the profile of these guide ribs 38 being shaped such that an entering sheet is directed to the first conveying roller pair. Similarly, the cover 37, on the outlet side, has ribs 39 in such an arrangement that a sheet is guided to the outlet after it has completed its passage through the treatment bath and leaves the pressing roller pair. In the area in-between, the cover 37, on the interior side, has a projection, the curved surface 40 of which surrounds the part of the conveyor worm 42 located outside the bath in the manner of a shell and, by means of the end parts 41 and 42, at both sides of the conveyor worm, dips into the bath. In this manner, the contact of the treatment liquid with the ambient air remains limited to a minimum, and a premature degeneration of the bath because of oxidation is prevented.

In addition, the treatment unit is constructed in such a fashion that several units which are identical with respect to one another can be assembled into an equipment configuration which may differ depending on the intended treatment process. For this purpose, the rear wall 14 of the receptacle 12 has a turned-over part 43 at its upper edge which, corresponding to the shape and position, fits into the upper end of the front wall 13. A first receptacle can therefore be connected to a second identical receptacle, in that the turned-over part of the rear wall of the first receptacle is hung into the front wall of the second receptacle, as shown in FIG. 1 with respect to treatment units B and B'. Likewise, the cover 37 has an edge projection 44 at the rear end which, corresponding to the shape and position, fits into a corresponding groove 45 along the front edge of the cover, so that, when the cover is closed, the rear edge projection 44 engages in the groove 45' of the cover 37' of a following treatment unit B'. In the same manner, the input unit A can be connected with a treatment unit B because, on the outlet side, it has the same connecting elements as the treatment unit itself.

Figure 3:
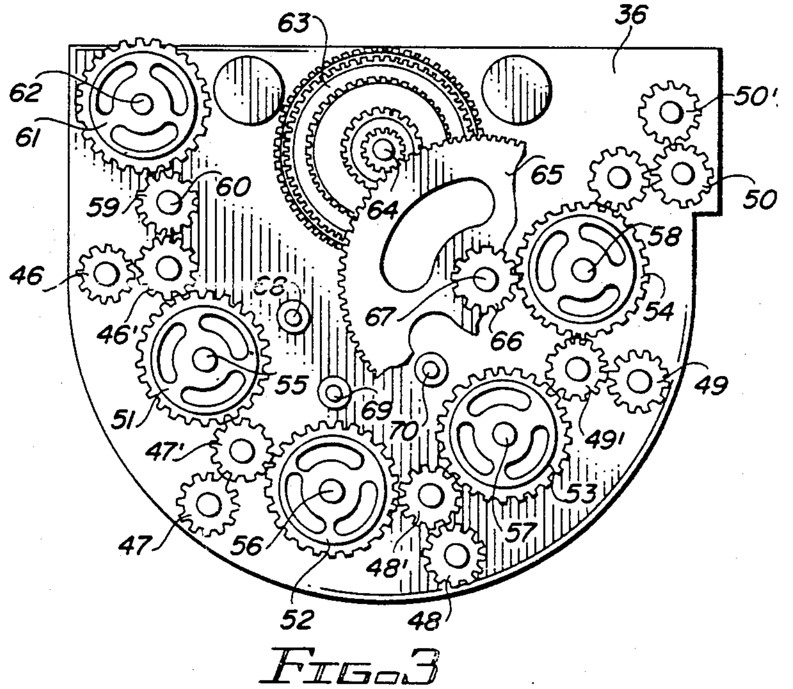
FIG. 3 is a front view of the toothed gear system for driving the conveying rollers.

The drive of the conveying rollers and of the conveyor worm is shown in FIG. 2 in connection with FIG. 3. The roller pins project out of the bearing bracket 36 at the end face and are equipped with pairs of toothed gears 46 - 46', 47 - 47', 48 - 48', 49 - 49' and 50 - 50' for each pair of rollers. The toothed gear pairs are coupled with one another by means of intermediate toothed gears 51–54 which are pivoted on fixed pins 55–58 of the bearing bracket 36. Another toothed gear 59 is coupled with the toothed gear pair 46 - 46' of the first roller pair, this additional toothed gear 59 being rotatable around a fixed pin 60 and, in turn, engages with an additional toothed gear 61 which can be rotated around a fixed pin 62, and, when the treatment unit is connected with the input unit, drives a corresponding toothed gear pair of the draw-in rollers 4 - 4' of the input unit.

A stepped gear 63 having several steps is disposed in the upper part of the bearing bracket 36 so that it can be rotated around a fixed pin 64. Two toothed gears 65 and 66 which are non-rotatably coupled with one another, can be rotated around a common pin 7 in such a position that the toothed gear 65 engages into the stepped gear 63, and the toothed gear 66 engages in one of the intermediate toothed gears 51–54, whereby the movement is transmitted from the stepped gear to the conveying rollers. The pin 67 may selectively be screwed into one of several bores 68–71 arranged on the bearing bracket and provided with threads, the arrangement of the bores being such that the toothed gears 65, 66 of the toothed gear pair which can be rotated around the pin 67, according to the position of the pin, engage in a desired step of the step gear 63 or in a defined intermediate toothed gear of intermediate toothed gears 51–54. In order to permit the engagement with the stepped gear 63 on different levels, the axial distance of the toothed gears 65, 66 can be adjusted. For this purpose, the outer toothed gear 65 can be slid on a supporting sleeve 72 which has suitable locking elements. It is obvious that the individual bores 69–71 which each determine one position for the toothed gear pair 65, 66 correspond to different transmission ratios and thus different rotational speeds of the conveying rollers. The advancing speed of the material to be treated can therefore be changed by a simple displacing of the pin of the toothed gear pair 65, 66 from one position into another position.

The conveyor worm 32 is driven from the stepped gear 63 by means of a toothed gear 73 on the worm shaft. The toothed gear 73 can preferably be exchanged in order to produce the engagement into the stepped gear 63 selectively on one of the two innermost steps and thus achieve two different rotational speeds.

The driving unit 74 (FIG. 2) comprises an electric motor 75, on the rotating shaft 76 of which a toothed gear 77 is disposed which engages from above into the stepped gear 63. Furthermore, the driving unit 74 forms a removable modular unit which, by means of suitable connecting elements of its housing, can be connected with the treatment unit. This housing rests on a supporting surface 78 which projects at the front end wall 16 of the receptacle 12 and is fastened to it by means of an eye hook 79, which starts at the housing bottom and engages in an eye 80 of the supporting surface. A longitudinal groove 81 in the housing bottom fits into a ledge-shaped projection 82 of the supporting surface so that a light-proof connection is established with the front end wall 16 of the receptacle. A wall extension 83 of the housing rests on the bearing bracket 36 and, at the lower end, has a turned-over part 84 which, in the closed position, receives an edge projection 85 of the cover 37. In the housing of the driving unit, the power supply circuit 86 for a heating coil 87 is also housed which is part of the removable unit and dips into the treatment bath.

Figure 4:
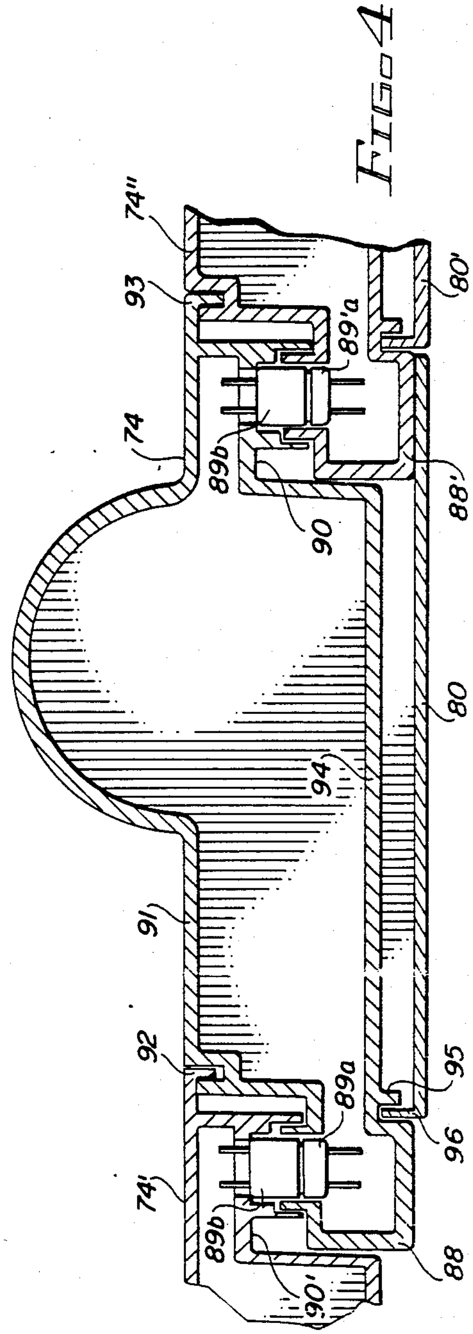
FIG. 4 is a simplified sectional view of the driving unit.

FIG. 4 is a simplified cross-sectional view of the driving unit and is limited to those parts which show the connection of the successive treatment units with one another. As shown in the figure, the housing of the driving unit, at the front side, on the bottom, has an extension 88 which accommodates the plug 89*a* of an electrical plug connection, while the housing, at the rear side, has a recess 90 which, with respect to the shape and the position, is adapted to the extension 88, this recess 90 receiving the socket 89*b* of the mentioned plug connection. The plug and the socket of the same driving unit are electrically connected with one another. The configuration is such that, when the driving units of two sucessive treatment units are connected, the rear recess 90 of one driving unit coincides with the front-side extension 88′ of the other driving unit so that the plug engages 89*a* in the socket 89*b*, whereby the electrical connection is established between the two driving units. Similarly, the input unit has an identical recess 90′ on the outlet side which, in turn, receives a socket 89′*b* of the plug connection and fits into the extension 88 of a following driving unit. The plug connection of the input unit is connected to a power supply cable so that, by means of the connection of several driving units, which are part of successive treatment units, and by means of the connection of the input unit with the first one of the treatment units, the electric power supply is ensured automatically for the whole machine. A switch at the input unit serves as the main switch for the electrical part of all operating units. The covering wall 91 of the housing of the driving unit, at the front edge, has a longitudinal groove 92 and, at the opposite end, has an edge projection 93 which are form-locking with respect to one another and form connecting elements for successive units. Similarly, the bottom 94 has a groove 95 into which a projection 96 fits of the supporting surface (FIG. 2).

The electric motor 75 is a synchronous motor whereby it is ensured that the advancing speed of the layer material in the individual treatment units equipped with a separate driving unit is rigorously the same. The equipping of each treatment unit with a separate driving unit has, among other tings, the advantage that the electric motor must be dimensioned only relative to the individual unit, irrespective of the number of treatment units fitted together. The construction of the driving and heating unit as a removable modular unit provides a complete separation of the electrical parts from the remainder of the machine with the obvious advantages with respect to care and servicing.

The preceding description shows how the individual treatment unit is composed of the bath receptacle, the roller unit, the driving and heating unit as well as the cover part and how several thus composed identical treatment units can be connected with one another and with an input unit. Starting with the treatment unit which, viewed in the advancing direction of the sheets, is to form the end of the machine, the assembly progresses to the respective preceding unit, until, as the last unit, the input unit is fitted to the head side of the machine. Vice versa, the disassembling of the machine starts with the removal of the input unit and continues successively to the end unit. It should be pointed out that by means of the necessary sequence of the setting up of the input unit as the last unit and its removal as the first unit, it is ensured that all treatment units are currentless during the assembly and disassembly of the machine, because only the inlet unit can be connected directly to the power supply network.

In a configuration stage provided for the processing of black and white material, the processing machine consists of the input unit and two connecting treatment units, of which the first one contains a developer solution and the second one contains washing water, preferably running water, which enters by way of an inlet and flows off by way of the overflow part. In a configuration stage provided for the processing of color material of a certain type, the treatment unit with the developer bath is followed by a treatment unit with a bleaching-/fixing bath and the latter, in turn, is followed by the washing unit. Other treatment processes for color material require separate baths for the bleaching and the fixing, so that, in such a case, an additional treatment unit will be added. Other processes may comprise an even larger number of separate treatment phases and may require the adding of other treatment units with the corresponding treatment solutions. An additional unit, which is equipped particularly for this purpose, may be connected to the washing unit as a dryer for the sheet material after the washing stage. The treatment times can be adapted to the different processes by changing, as described above, the passage time of the material to be treated by the selection of the corresponding transmission ratio in the drive of the conveying rollers.

The lightproof coupling of the individual treatment units with one another and the lightproof closure of these units to the outside ensure that the exposed sheet passes through the successive treatment units in a light-protected path so that with the exception of the sheet feeding, the whole working process may take place in light. Furthermore, the input unit offers space for the accommodation of a whole sheet and the hinged lid may be closed as soon a the sheet is gripped by the draw-in rollers.

We claim:

1. A continuous modular processing machine for processing exposed sheet-shaped photographic paper or other photographic material, comprising in combination:

a. an input unit for inserting the exposed sheet material;

b. a plurality of treatment units of identical construction, each treatment unit including a bath receptacle for accommodating different treatment baths;

c. each of said treatment units having coupling means adapted to couple each said treatment unit to another treatment unit arranged therebehind, said coupling means of each said treatment unit also being adapted to couple a first one of said treatment units to said input unit, said coupling means allowing said processing machine to be constructed as a modular system including said input unit and said plurality of treatment units arranged behind one another for accommodating different treatment baths; and d. each of said treatment units including conveying means for conveying the sheet material through a treatment bath, said conveying means including a set of rollers for conveying the sheet material to be treated, each of said treatment units further including an electric drive for turning said set of rollers, the electric drive of a first of said treatment units being supplied with the electricity by said input unit, and the electric drives of succeeding treatment units being supplied with electricity by the preceding treatment unit.

2. A processing machine according to claim 1 wherein each said bath receptacle has a removable cover which closes off the receptacle in a lightproof fashion while leaving exposed an inlet and outlet channel for the sheet material, the bath receptacle and the removable cover, on sides which are opposite in passage direction of the material, each having form-locking connection elements for the lightproof connection of one bath receptacle to a next one.

3. A processing machine according to claim 2 wherein said form-locking connection elements have form-locking plug parts at the connecting points.

4. A processing machine according to claim 1 wherein each of the rollers of said set of rollers includes a toothed roller gear, said plurality of toothed roller gears being motionally connected with another and with said electric drive by means of a toothed gear transmission.

5. A processing machine according to claim 4 wherein said toothed gear transmission has a step gear engaging with said electric drive and has a coupling member between the step gear and the plurality of the toothed roller gears, the step gear having a plurality of different steps, and the coupling member being placeable against the different steps of the step gear in order to achieve different transmission ratios.

6. A processing machine according to claim 5 wherein the coupling member consists of two coaxial toothed gears which are non-rotatably connected with one another and which can be rotated around a common pin that can be displaced in different positions, one of the two toothed gears engaging with the step gear on a step determined by the position of the pin, and the other toothed gear engaging with the plurality of the toothed roller gears.

7. A processing machine according to claim 1 each of said treatment units includes a housing with mutually formlocking connection elements adapted to engage said bath receptacle thereof, said housing partially containing said electric drive, each said housing further including an electric heater for heating the treatment bath within said bath receptacle, said electric drive, electric heater, and housing collectively forming a driving and heating unit.

8. A processing machine according to claim 7 wherein the housing has electrical plug connections on opposite ends thereof which are complementary to one another and which are electrically connected with one another, by means of which the driving and heating unit of one bath receptacle receives electrical power from a preceding driving and heating unit and is adapted to pass such electrical power on to a following driving and heating unit.

9. A processing machine according to claim 1 wherein said electric drive comprises a synchronous electric motor.

10. A processing machine according to claim 4 wherein said input unit has an accommodating space for a sheet to be treated said input unit having a removable lid Which can be closed off in a lightproof manner, said input unit having a pair of draw-in rollers driven by the toothed gear transmission of the following treatment unit.

11. A processing machine according to claim 1 wherein each said treatment unit includes means for mechanically adjusting the transmission ratio between said electric drive and said set of rollers corresponding to a number of predetermined advancing speeds for the sheet material to be treated.

12. A processing machine according to claim 1 Wherein each of said treatment units includes bath circulating means for circulating the treatment bath contained therein, said bath circulating means being mechanicallY actuated by the same electric drive used to turn said set of rollers.

13. A processing machine according to claim 12 wherein each of the rollers of said set of rollers includes a toothed roller gear, said pluralitY of toothed roller gears being motionallY connected with one another and with said electric drive by means of a toothed gear transmission, and wherein the bath circulating means comprises a conveyor worm disposed in a central area of the bath receptacle, said conveyor worm being rotatable around a shaft which is parallel to said set of rollers, said conveyor worm being driven by said toothed gear transmission.

* * * * *